Nov. 18, 1924.
G. H. NICHOLS
THEFT PREVENTING DEVICE
Filed Oct. 15, 1923
1,516,453
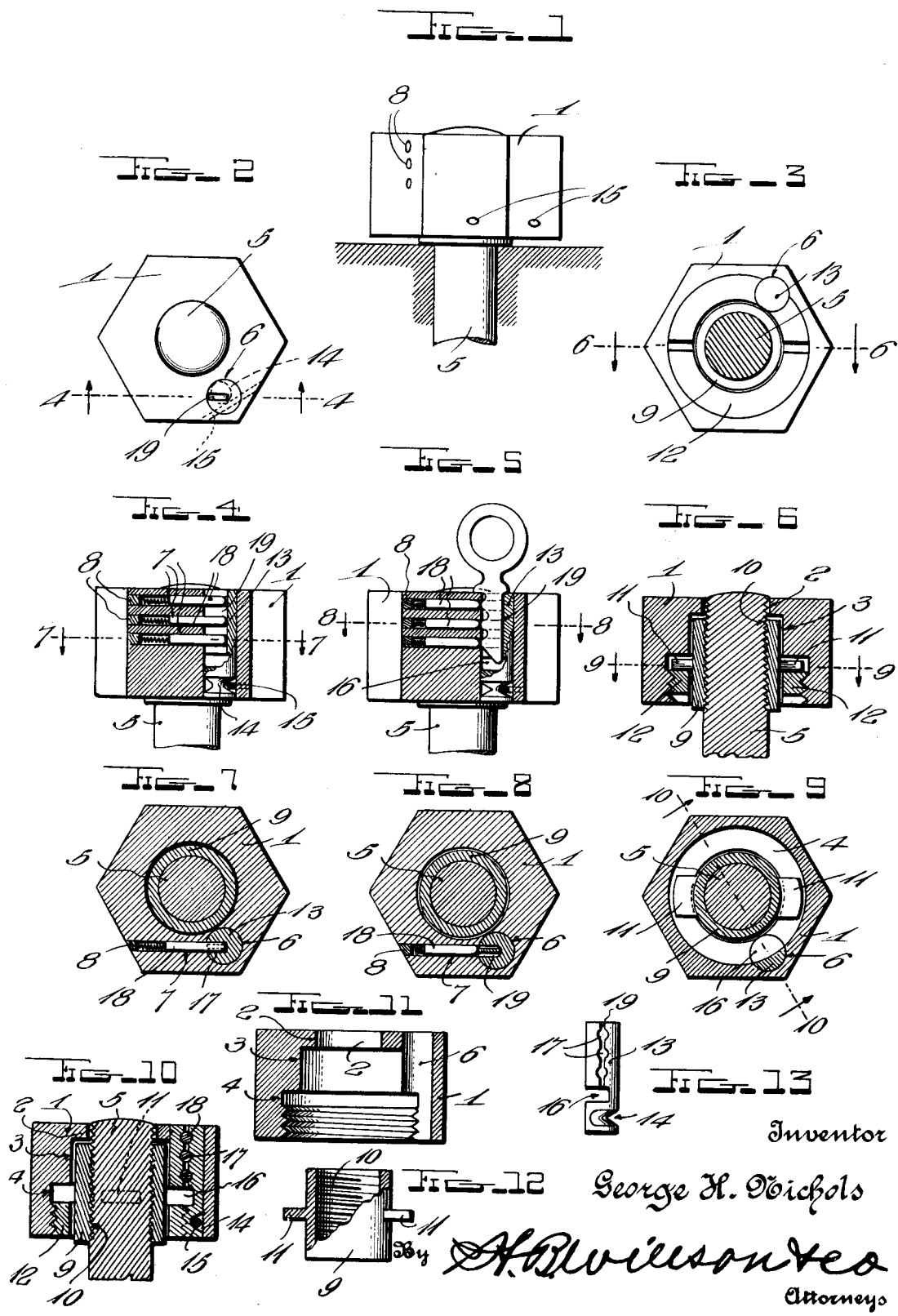
Inventor
George H. Nichols
By H. B. Williamson & Co.
Attorneys Patented Nov. 18, 1924.

1,516,453

UNITED STATES PATENT OFFICE.

GEORGE H. NICHOLS, OF ELKHART, INDIANA.

THEFT-PREVENTING DEVICE.

Application filed October 15, 1923. Serial No. 668,771.

*To all whom it may concern:*

Be it known that I, GEORGE H. NICHOLS, a citizen of the United States, residing at Elkhart, in the county of Elkhart and State of Indiana, have invented certain new and useful Improvements in Theft-Preventing Devices; and I do declare the following to be a full, clear, and exact description of the invention, such as will enable others skilled in the art to which it appertains to make and use the same.

In mounting spare rims and tires on automobiles, the tire rack or carrier is often provided with a rim clamp held in operative position by a nut, but it is a simple matter for the thief to remove this nut and steal the rim and tire. Similarly, a tire and rim can be stolen from an automobile wheel. It is the object of my invention however, to provide an improved form of nut which may be threaded in place in the usual manner and then set by a key, so that if the body of the nut is rotated in an attempt to remove it, it will merely rotate about a separate, internal, threaded sleeve which engages the bolt, and will not effect removal of the nut from the bolt.

With the foregoing in view, the invention resides in the novel subject matter hereinafter described and claimed, the description being supplemented by the accompanying drawings.

Figure 1 is a side elevation showing the nut applied to a bolt.

Figure 2 is an outer end elevation of the nut.

Figure 3 is an inner end elevation.

Figure 4 is a longitudinal sectional view as indicated by line 4—4 of Fig. 2, showing the relation of parts after complete application of the nut to the bolt.

Figure 5 is a duplicate of Fig. 4 with the exception that it illustrates the manner in which the locking tumblers are retracted by insertion of the key.

Figure 6 is a central longitudinal sectional view as indicated by line 6—6 of Fig. 3.

Figures 7, 8 and 9 are transverse sectional views as indicated by lines 7—7, 8—8 and 9—9 of Figs. 4, 5 and 6 respectively.

Figure 10 is a longitudinal sectional view at an angle to Fig. 6, as designated by line 10—10 of Fig. 9.

Figure 11 is a longitudinal sectional view through the body of the nut.

Figure 12 is an elevation partly in section of the sleeve which is rotatable within the nut body.

Figure 13 is a side elevation of the key-controlled lock cylinder.

In the present showing of my invention, the numeral 1 designates a hexagonal nut body having a stepped central bore whose steps are designated by the numerals 2, 3 and 4, the diameter of the portion 2 being the same as the bolt 5 upon which the nut is to be threaded, while the diameter of the portion 3 is somewhat larger than the bolt and the diameter of the portion 4 is still greater. The portion 2 is at the outer end of the nut body 1, the portion 4 is at the inner end of said body, and the intermediate portion 3 is between the portions 2 and 4.

At one side of its central bore, the nut body 1 is provided with an off-center relatively small bore 6, and a plurality of transverse tumbler-receiving bores 7, are formed in said body with their inner ends in communication with said off-center bore 6. The outer ends of the bores 7 are preferably closed by friction plugs 8 and the surface of the nut body is so finished as to render such plugs invisible.

Rotatable within the portion 3 of the central bore of the nut body 1 and extending through the portion 4 of said bore, to the inner end of said body, is a sleeve 9 provided with internal screw-threads 10 for engagement with the bolt 5. This sleeve is provided with an outwardly extending projection, or with two of said projections as indicated by the numerals 11, said projections being received in the inner end of the bore portion 4. A retaining ring 12 is threaded into this portion of the bore and engages the projections 11, to hold the sleeve within the nut body, and by reference to Figs. 6, 9 and 10, it will be seen that the construction used, provides the central bore of the nut body 1, with a circumferential groove into which the projections 11 extend. This same provision might be made in different ways from that shown.

A locking cylinder 13 is rotatably received in the off-center bore 6, said cylinder being provided in its inner end with a peripheral groove 14 which receives a retaining pin 15 passing across said bore 6, so that the cylinder 13 is held against detachment and is limited in its rotation. It will be seen from the drawings that the bore 6 intersects the circumferential groove into which the projections 11 extend and it will be further noted that when a portion of the cylinder 13 extends across this groove in the path of the projections 11, an operating connection is established between the nut body 1 and the sleeve 9, so that rotation of said body will thread the sleeve onto or from the bolt, as occasion may require. The cylinder 13 however, is provided with a notch 16 which may be positioned to register with the receiving groove of the projections 11, so that no connection is provided between the nut body 1 and the sleeve 9, permitting the former to rotate idly upon the latter when the nut is entirely in place upon its bolt. When the cylinder 13 is in a position to register the notch 16 with the above named groove, a plurality of tumbler-receiving sockets 17 with which said cylinder is formed, register with the tumbler-receiving bores 7, and spring-pressed tumblers 18, mounted in said bores 7, are then received in the sockets 17. Thus, the cylinder 13 is held against rotation, until the proper key is inserted into the key-slot 19 of the cylinder, as shown in Fig. 5. Insertion of this key, forces the tumblers 18 from the sockets 17 and permits the cylinder to be rotated so that it may establish an operating connection between the nut body 1 and the sleeve 9.

In applying the improved nut, the cylinder 19 is set so that it is in the path of the projections 11. Then, the nut may be threaded onto the bolt in the usual manner. This having been done, the key is used to turn the cylinder 13 until the sockets 17 are alined with the spring-pressed tumblers 18. Then, upon withdrawal of the key, these tumblers project into the sockets and lock the cylinder in a position in which its notch 16 registers with the receiving groove of the projections 11. Thus, the nut body 1 is free to rotate about the sleeve 9 and the latter will not be effected by rotation of said body, so that it is impossible to remove the entire nut from the bolt, without first inserting the proper key and turning the cylinder 13 so that it projects across the receiving groove of the above named projections 11. As this key is carried only by an authorized person, it will be seen that he only can remove the nut from the bolt and consequently theft of a tire or rim secured by the nut, or theft of any other object secured by the invention, is prevented.

As excellent results are obtainable from the details disclosed, they may well be followed, but within the scope of the invention as claimed, numerous minor changes may be made.

I claim:

1. A nut comprising a body having a bore whose wall is formed with a continuous circumferential groove, an internally threaded sleeve rotatable in said bore and having a projection extending into said groove, and means carried by said body and movable into and out of said groove to abut said projection and thus connect the body and sleeve for rotation as a single unit.

2. A nut comprising a body having a bore whose wall is formed with a continuous circumferential groove, an internally threaded sleeve rotatable in said bore and having a projection extending into said groove, and a key-controlled lock cylinder rotatable in said body on an axis parallel to said bore and having a portion projectable into and out of said groove to abut said projection and thus connect the body and sleeve for rotation as a single unit.

3. A device of the character described comprising a body having a central bore, an off-center bore, a circumferential groove in the wall of said central bore intersecting said off-center bore, and a plurality of transverse tumbler-receiving bores opening into said off-center bore; a member rotatable in said central bore and having a projection received in said groove, a lock cylinder rotatable in said off-center bore and extending across said groove, said cylinder having a notch for registration with said groove when the cylinder is turned to one position, said cylinder being formed with tumbler sockets and a key slot across the same, and spring-pressed tumblers in said tumbler-receiving bores for projection into said sockets when said notch is in registration with said groove.

In testimony whereof I have hereunto affixed my signature.

GEORGE H. NICHOLS.